Patented Dec. 31, 1935

2,025,951

UNITED STATES PATENT OFFICE 2,025,951

MANUFACTURE OF MOLDED COMPOSITIONS FOR BRAKE LININGS OR SIMILAR ARTICLES

Joseph Nestor Kuzmick, Passaic, N. J., assignor to The Manhattan Rubber Manufacturing Division of Raybestos-Manhattan, Inc., Passaic, N. J., a corporation of New Jersey No Drawing. Application November 13, 1933, Serial No. 697,808

6 Claims. (Cl. 106—22)

This invention relates to the manufacture of molded composition brake linings and similar friction or tractive-surface bodies such as clutch facings, brake blocks and the like.

Brake linings and similar friction or tractive articles have been made by three general methods:—(1) the covering or impregnating of asbestos cloth or fabric with a suitable binder, (2) the felting together of asbestos fibres and impregnating the felted mass with the proper type of binder, and (3) the mixing of a binder with asbestos fibres with or without fillers and then molding the same under heat and pressure to the shape desired. In all of these methods the binders used are of the type that react with heat to give the desired density or hardness.

My invention relates to the third type of method in which heat reacting or potentially reactive synthetic resins are employed as the binders. It is generally desirable to use a minimum amount of binder and a maximum amount of asbestos fibres and fillers. The very form and shape of the fluffy, asbestos fibres, particularly in the relatively high amounts used makes it difficult to uniformly distribute the binder resins throughout the mass. If the binder is not uniformly distributed, then the resultant friction material will vary in hardness or density, the frictional properties of the material will be erratic, the wear in service will be impaired and the difficulties of manufacture will be increased.

If liquid potentially reactive synthetic resins are used in limited amounts, then an intimate, uniform mixture is difficult to secure, since the liquid resins in general are relatively quite viscous, and the volume of the resins is small compared to the mass of fluffy asbestos fibres to be covered. If a solvent is used to increase the volume and decrease the viscosity of the resins, then an additional operation is required to remove the solvent. This operation, together with the cost of solvent, is expensive. In either case during the heat reaction process whenever liquid resins are employed there is an excessive evolution of gases and water vapor which tend to make the friction material blistered or laminated.

If dry potentially reactive synthetic resins are employed, then it is difficult to secure an intimate mixture and uniformly wet the asbestos fibres with the binding resins; but since there is much less evolution of gases during the heat reaction process with the use of powdered dry resins, it is highly desirable to use powdered resins in the mix if possible.

I have found that the problem, therefore, resolves itself to the securing of a proper dry flux or plasticizer which can be powdered and mixed with the dry resins in the mass. This flux or plasticizer must have the properties of readily melting under heat and either uniting or dissolving with the binder resins in such a manner as to greatly reduce the viscosity of the resins while in the molten state. This flux or plasticizer must not seriously interfere with the strength of the finished resins themselves nor have any detrimental effect on the frictional properties of the finished material.

I have found that toluenesulphonanilid possesses these properties to a marked degree. In my process I mix thoroughly in a tumbling barrel or Warner-Pfleider mixer 60 parts by weight of asbestos fibre, 30 parts of powdered phenol-formaldehyde or phenol-furfural resins, and 2 to 5 parts of toluenesulphonanilid, with other suitable fillers, and then mold the resultant mixture under pressure and heat to the desired size and shape. When the resins have reacted to the infusible state, then the material is ground or buffed to size and the article is ready for use. I find that under heat and pressure toluenesulphonanilid readily melts and causes the resins to be greatly reduced in viscosity during the heat reacting process, and that as a consequence the resins are readily and uniformly forced throughout the mass, thereby wetting the asbestos fibres much better and resulting in a very uniform, dense piece of friction or tractive material, having great strength, a high degree of resistance to wear, and very uniform service performance. In addition I find that this process greatly facilitates the manufacturing steps in: (1) causing the mix or the mass to flow more readily and conform itself more uniformly to the molded shape and (2) greatly reducing the number of defective pieces and those broken during manufacture.

While I prefer to use phenol-formaldehyde or phenol-furfural synthetic resins, I do not wish to confine myself solely to these resins. I may also use resins made from diatomic phenols, such as resorcinol, or the oil-soluble synthetic resins. While I prefer to use the resins in a dry powdered state as mentioned, I do find that toluenesulphonanilid has a similar beneficial effect with liquid synthetic resins. The mix or mass of asbestos fibres, resin and the plasticizing agent is a relatively dry mix since all of the components thereof are in a relatively dry condition; however, it should be understood that the asbestos fibres have a definite index of absorption and that it is therefore within my invention to use a plasticizing agent which is not altogether dry in itself but which is relatively dry in the mass or mixture, so that the mass or mixture is in a dry state. In any event, the fibres, the resin and the plasticizing agent are retained as distinct components of the mix, the plasticizing agent functioning when the mix is reacted under heat and pressure to melt, unite with and reduce the viscosity of the resin to accomplish the results mentioned. Obviously I can vary the proportions of asbestos fibres, fillers, binding resins, and toluenesulphonanilid, depending on the type of resin used and the particular type of friction material, desired.

In the manufacture of these friction or tractive bodies, asbestos fibres form the greater or major portion of the mix; where mineral fillers are desired to be added, I prefer to use an amount of such fillers in lieu of an equivalent amount of the asbestos fibres; thus, in lieu of 60% of asbestos fibres I may employ 45% of asbestos and 15% of mineral fillers, both of these together forming the body material of the mixture. I prefer to use toluenesulphonanilid as the plasticizing agent, yet I have found that naphthalene, or chlorinated naphthalene, or phthalic anhydride may be used, though perhaps not so advantageously.

I claim:

1. The process of making brake linings or similar friction material which consists in mixing dry fluffy asbestos fibres, a potentially reactive synthetic resin and a plasticizer to produce a relatively dry and fibrous mass or mix in which the fibres, resin and plasticizer are retained as distinct components of the fibrous mix, and in then reacting the fibrous mass or mix under heat and pressure to the infusible state to produce a molded article of friction material, the said molded article being shaped to form brake linings, clutch facings, brake blocks and the like.

2. The process of making brake linings or similar friction material which consists in mixing dry fluffy asbestos fibres, a potentially reactive phenol-aldehyde synthetic resin and a plasticizer of the class consisting of toluenesulphonanilid, naphthalene, chlorinated naphthalene and phthalic-anhydride to produce a relatively dry and fibrous mass or mix in which the fibres, resin and plasticizer are retained as distinct components of the fibrous mix, and in then reacting the fibrous mass or mix under heat and pressure to the infusible state to produce a molded article of friction material, the said molded article being shaped to form brake linings, clutch facings, brake blocks and the like.

3. The process of making brake linings or similar friction material which consists in mixing a body material composed mainly of dry fluffy asbestos fibres, a binder of potentially reactive phenol-aldehyde synthetic resin and toluenesulphonanilid in substantially the weight proportions of 60 parts of body material, 30 parts of binder and 2 to 5 parts of toluenesulphonanilid, to produce a relatively dry and fibrous mass or mix in which the fibres, resin and toluenesulphonanilid are retained as distinct components of the fibrous mix, and in then reacting the fibrous mass or mix under heat and pressure to the infusible state to produce a molded article of friction material, the said molded article being shaped to form brake linings, clutch facings, brake blocks and the like.

4. A molded composition of friction material comprising dry fluffy asbestos fibres, a potentially reactive synthetic resin and a plasticizer retained as distinct components of a relatively dry and fibrous mass or mix reacted under heat and pressure to the infusible state and shaped to form a brake lining, clutch facing, brake block and the like.

5. A molded composition of friction material comprising dry fluffy asbestos fibres, a potentially reactive phenol-aldehyde synthetic resin and a plasticizer of the class consisting of toluenesulphonanilid, naphthalene, chlorinated naphthalene and phthalic-anhydride retained as distinct components of a relatively dry and fibrous mass or mix reacted under heat and pressure to the infusible state and shaped to form a brake lining, clutch facing, brake block and the like.

6. A molded composition of friction material comprising a body material composed mainly of dry fluffy asbestos fibres, a binder of potentially reactive phenol-aldehyde synthetic resin and toluenesulphonanilid in substantially the weight proportions of 60 parts of body material, 30 parts of binder and 2 to 5 parts of toluenesulphonanilid retained as distinct components of a relatively dry and fibrous mass or mix reacted under heat and pressure to the infusible state and shaped to form a brake lining, clutch facing, brake block and the like.

JOSEPH NESTOR KUZMICK.